(12) United States Patent
Karakama et al.

(10) Patent No.: US 11,821,783 B2
(45) Date of Patent: Nov. 21, 2023

(54) INFORMATION PROCESSING SYSTEM, INFORMATION PROCESSING APPARATUS, PROGRAM, AND INFORMATION PROCESSING METHOD

(71) Applicants: METAWATER Co., Ltd., Tokyo (JP); Extranet Systems Inc., Hiroshima (JP)

(72) Inventors: Takahiro Karakama, Tokyo (JP); Hiroyuki Takahashi, Yokohama (JP); Shigeyuki Okada, Tokyo (JP); Takayoshi Yamamoto, Hiroshima (JP)

(73) Assignees: METAWATER Co., Ltd., Tokyo (JP); Extranet Systems Inc., Hiroshima (JP)

( * ) Notice: Subject to any disclaimer, the term of this patent is extended or adjusted under 35 U.S.C. 154(b) by 24 days.

(21) Appl. No.: 17/263,153

(22) PCT Filed: Jul. 16, 2019

(86) PCT No.: PCT/JP2019/027977
§ 371 (c)(1),
(2) Date: Jan. 26, 2021

(87) PCT Pub. No.: WO2020/026793
PCT Pub. Date: Feb. 6, 2020

(65) Prior Publication Data
US 2021/0164829 A1    Jun. 3, 2021

(30) Foreign Application Priority Data
Jul. 30, 2018 (JP) .................... 2018-142729

(51) Int. Cl.
*G01H 13/00* (2006.01)
*G06F 17/18* (2006.01)
(52) U.S. Cl.
CPC ............. *G01H 13/00* (2013.01); *G06F 17/18* (2013.01)

(58) Field of Classification Search
None
See application file for complete search history.

(56) References Cited

U.S. PATENT DOCUMENTS

| | | | |
|---|---|---|---|
| 2003/0045976 A1* | 3/2003 | Bechhoefer | G01H 1/003 701/30.2 |
| 2005/0114082 A1* | 5/2005 | Kant | F01D 21/14 702/183 |

(Continued)

FOREIGN PATENT DOCUMENTS

| | | |
|---|---|---|
| JP | S6317422 U | 2/1988 |
| JP | 3392552 B2 | 3/2003 |

(Continued)

OTHER PUBLICATIONS

Espacenet machine translation, Shimamura Makoto et al., "Bridge Soundness Evaluation System, Bridge Soundness Evaluation Method and Bridge Soundness Evaluation Program," Apr. 18, 2012 (Year: 2012).*

(Continued)

*Primary Examiner* — Michael J Dalbo
*Assistant Examiner* — Denise R Karavias
(74) *Attorney, Agent, or Firm* — KENJA IP LAW PC (57) ABSTRACT

An information processing system comprises: an acquisition means configured to acquire vibration of a device that vibrates during operation, as time-series data of a physical quantity A indicated by a plurality of axis components in a three-dimensional coordinate system; a calculation means configured to calculate a first evaluation value E indicating a degree of bias of the vibration of the device between axes, based on the time-series data of the physical quantity A; and an estimation means configured to estimate a degradation level G of the device based on the first evaluation value E.

9 Claims, 7 Drawing Sheets

(56) References Cited

U.S. PATENT DOCUMENTS

| 2012/0330614 | A1 | 12/2012 | Kar | |
|---|---|---|---|---|
| 2018/0021904 | A1* | 1/2018 | Koike | F16F 15/0235 |
| | | | | 384/99 |
| 2019/0301975 | A1* | 10/2019 | Sugiura | F16C 35/12 |

FOREIGN PATENT DOCUMENTS

| JP | 2005147081 | A | 6/2005 |
|---|---|---|---|
| JP | 4918291 | B2 | 4/2012 |
| JP | 2012098149 | A | 5/2012 |
| JP | 2012100434 | A | 5/2012 |
| JP | 2012251858 | A | 12/2012 |
| JP | 5425038 | B2 | 2/2014 |
| JP | 5709794 | B2 | 4/2015 |

OTHER PUBLICATIONS

Espacenet machine translation, Kobayashi Shinji et al., "Portable Vibration Diagnosis Device," May 24, 2012 (Year: 2012).*

Espacenet machine translation, Lin Jing et al., "Envelope Demodulation Frequency Band Determination Method Based on Harmonic-to-Noise Ratio," Aug. 5, 2015 (Year: 2015).*

Espacenet machine translation, Yamamoto Takayoshi, JP2005147081A, Jun. 9, 2005 (Year: 2005).*

Espacenet machine translation with Google machine translation of selected figures, JP2005147081A, Diagnostic Method for Pump, Computer Program, and System for Diagnosing Pump, Jun. 9, 2005 (Year: 2005).*

Feb. 2, 2021, International Preliminary Report on Patentability issued in the International Patent Application No. PCT/JP2019/027977.

Sep. 28, 2021, Notification of Reasons for Refusal issued by the Japan Patent Office in the corresponding Japanese Patent Application No. 2020-097920.

Oct. 15, 2019, International Search Report issued in the International Patent Application No. PCT/JP2019/027977.

Jun. 8, 2022, Invitation pursuant to Rule 62a(1) EPC issued by the European Patent Office in the corresponding European Patent Application No. 19845053.8.

Oct. 11, 2022, the Extended European Search Report issued by the European Patent Office in the corresponding European Patent Application No. 19845053.8.

\* cited by examiner

INFORMATION PROCESSING SYSTEM, INFORMATION PROCESSING APPARATUS, PROGRAM, AND INFORMATION PROCESSING METHOD

TECHNICAL FIELD

The present disclosure relates to an information processing system, an information processing apparatus, a program, and an information processing method.

BACKGROUND

Techniques of estimating the state of a device using data from a sensor are conventionally known. For example, JP 2012-100434 A (PTL 1) discloses an railroad vehicle anomaly diagnosis system that diagnoses an anomaly caused by degradation or the like in components of a railroad vehicle based on the acceleration, velocity, and current position of the railroad vehicle. JP 2012-251858 A (PTL 2) discloses a structure that, in an angle detector using a ball bearing as a bearing, provides an accelerometer on a bearing fixing plate on which the bearing is installed and detects vibration which occurs when rotation operation fails.

CITATION LIST

Patent Literature

PTL 1: JP 2012-100434 A
PTL 2: JP 2012-251858 A

SUMMARY

Technical Problem

Methods of estimating the state of a device based on whether the magnitude of the vibration of the device exceeds a predetermined threshold are conventionally known. With such methods, however, the accuracy of estimating the state of the device is not always sufficient, because the magnitude of the vibration of the device also varies due to, for example, the load of the device. To accurately estimate the state of the device, frequency analysis on the vibration of the device is commonly performed. For the frequency analysis, it is necessary to detect the vibration of the device by a sensor having relatively high sampling frequency (e.g. about 80 kHz), and process, by a calculator having relatively high computing power, a large amount of data output from the sensor. Accordingly, a sensor having relatively low sampling frequency (e.g. about several hundred Hz) and a calculator having relatively low computing power cannot be used. Thus, the convenience of the techniques of estimating the state of a device using data from a sensor is not always high.

It could therefore be helpful to provide an information processing system, an information processing apparatus, a program, and an information processing method that can improve the convenience of the techniques of estimating the state of a device using data from a sensor.

Solution to Problem

An information processing system according to one of the disclosed embodiments is an information processing system comprising: an acquisition means configured to acquire vibration of a device that vibrates during operation, as time-series data of a physical quantity A indicated by a plurality of axis components in a three-dimensional coordinate system; a calculation means configured to calculate a first evaluation value E indicating a degree of bias of the vibration of the device between axes, based on the time-series data of the physical quantity A; and an estimation means configured to estimate a degradation level G of the device based on the first evaluation value E.

An information processing apparatus according to one of the disclosed embodiments is an information processing apparatus comprising: an acquisition means configured to acquire vibration of a device that vibrates during operation, as time-series data of a physical quantity A indicated by a plurality of axis components in a three-dimensional coordinate system; a calculation means configured to calculate a first evaluation value E indicating a degree of bias of the vibration of the device between axes, based on the time-series data of the physical quantity A; and an estimation means configured to estimate a degradation level G of the device based on the first evaluation value E.

An information processing apparatus according to one of the disclosed embodiments is an information processing apparatus in an information processing system that includes: an acquisition means configured to acquire vibration of a device that vibrates during operation, as time-series data of a physical quantity A indicated by a plurality of axis components in a three-dimensional coordinate system; a calculation means configured to calculate a first evaluation value E indicating a degree of bias of the vibration of the device between axes, based on the time-series data of the physical quantity A; and an estimation means configured to estimate a degradation level G of the device based on the first evaluation value E, the information processing apparatus comprising at least one of the acquisition means, the calculation means, and the estimation means.

A program according to one of the disclosed embodiments is a program for causing an information processing apparatus to function as: an acquisition means configured to acquire vibration of a device that vibrates during operation, as time-series data of a physical quantity A indicated by a plurality of axis components in a three-dimensional coordinate system; a calculation means configured to calculate a first evaluation value E indicating a degree of bias of the vibration of the device between axes, based on the time-series data of the physical quantity A; and an estimation means configured to estimate a degradation level G of the device based on the first evaluation value E.

A program according to one of the disclosed embodiments is a program for causing, in an information processing system that is composed of a plurality of information processing apparatuses communicably connected to each other and includes: an acquisition means configured to acquire vibration of a device that vibrates during operation, as time-series data of a physical quantity A indicated by a plurality of axis components in a three-dimensional coordinate system; a calculation means configured to calculate a first evaluation value E indicating a degree of bias of the vibration of the device between axes, based on the time-series data of the physical quantity A; and an estimation means configured to estimate a degradation level G of the device based on the first evaluation value E, one of the plurality of information processing apparatuses to function as at least one of the acquisition means, the calculation means, and the estimation means.

An information processing method according to one of the disclosed embodiments is an information processing method comprising: acquiring vibration of a device that vibrates during operation, as time-series data of a physical quantity A indicated by a plurality of axis components in a three-dimensional coordinate system; calculating a first evaluation value E indicating a degree of bias of the vibration of the device between axes, based on the time-series data of the physical quantity A; and estimating a degradation level G of the device based on the first evaluation value E.

Advantageous Effect

It is therefore possible to provide an information processing system, an information processing apparatus, a program, and an information processing method that can improve the convenience of the techniques of estimating the state of a device using data from a sensor.

DETAILED DESCRIPTION

One of the disclosed embodiments will be described below.

Figure 1:
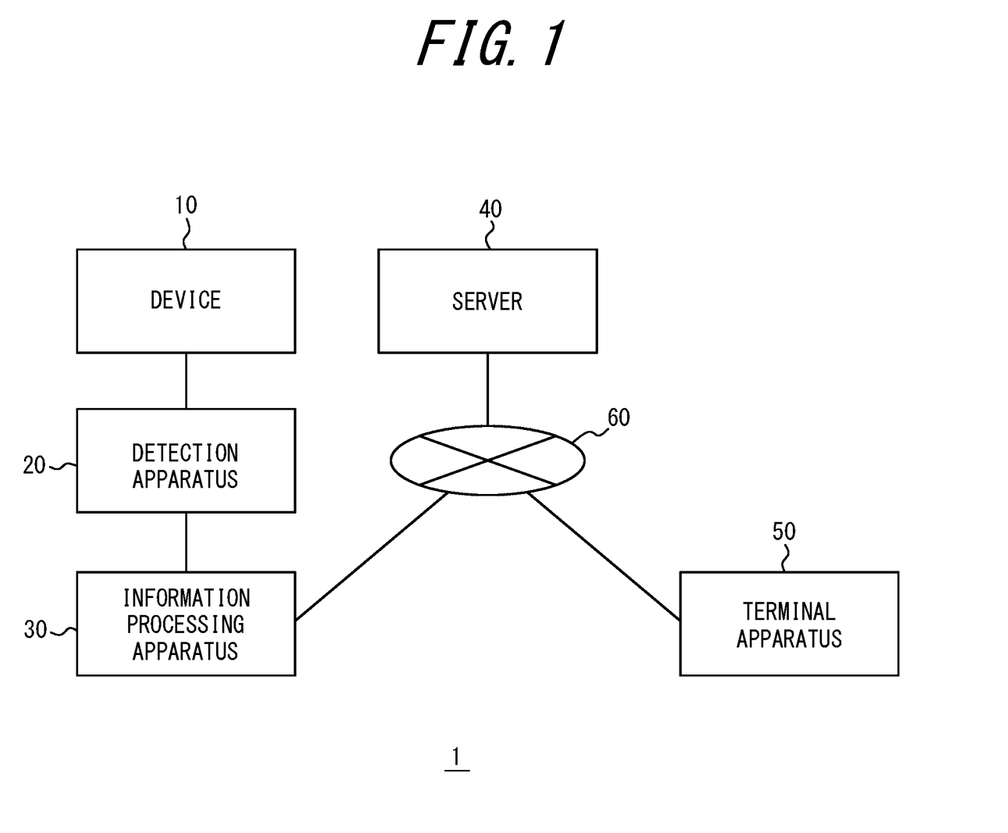
FIG. 1 is a block diagram illustrating a schematic structure of an information processing system according to one of the disclosed embodiments.

An information processing system 1 according to one of the disclosed embodiments will be described below, with reference to FIG. 1. In this embodiment, the information processing system 1 includes a detection apparatus 20, an information processing apparatus 30, a server 40, and a terminal apparatus 50. The information processing apparatus 30, the server 40, and the terminal apparatus 50 are communicably connected with a network 60 such as the Internet.

The information processing system 1 is a system that estimates the degree of degradation of a device 10 and presents the estimated degree of degradation to a user. The device 10 is a rotator as an example, but may be any device that vibrates during operation. As an overview, the information processing system 1 detects vibration of the device 10 that vibrates during operation, by the detection apparatus 20. The information processing system 1 estimates the degradation level G of the device 10 by the information processing apparatus 30, based on the output of the detection apparatus 20. The information processing system 1 accumulates the degradation level G of the device 10 in the server 40. The information processing system 1 transmits the degradation level G of the device 10 accumulated in the server 40, to the terminal apparatus 50 used by the user. The information processing system 1 then presents the degradation level G of the device 10 to the user by the terminal apparatus 50.

(Hardware Structure of Detection Apparatus)

The hardware structure of the detection apparatus 20 will be described below. The detection apparatus 20 is an apparatus that includes a sensor used in a state of being attached to the device 10, and an output interface that outputs data detected by the sensor. Non-limiting examples of the sensor included in the detection apparatus 20 include a three-axis accelerometer and a three-axis gyroscope sensor. As the sensor included in the detection apparatus 20, a sensor having a sampling frequency of several hundred Hz (e.g. about 170 Hz) can be used, as described later.

(Hardware Structure of Information Processing Apparatus)

Figure 2:
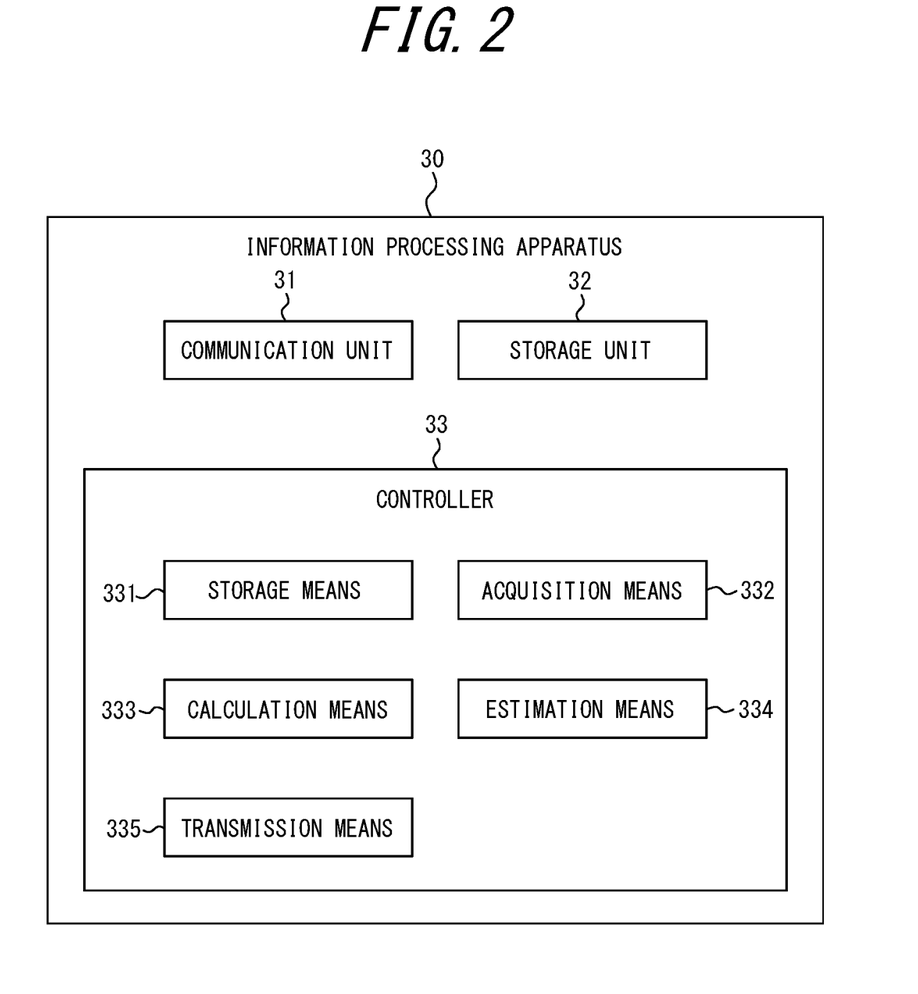
FIG. 2 is a block diagram illustrating a schematic structure of an information processing apparatus.

The hardware structure of the information processing apparatus 30 will be described below, with reference to FIG. 2. The information processing apparatus 30 includes a communication unit 31, a storage unit 32, and a controller 33.

The communication unit 31 includes one or more communication interfaces that perform wireless or wired communication with external apparatuses. In this embodiment, the communication unit 31 includes a communication interface that communicates with the detection apparatus 20 and a communication interface that communicates with the network 60.

The storage unit 32 includes one or more memories. The one or more memories may each be any memory, and non-limiting examples include a semiconductor memory, a magnetic memory, and an optical memory. The storage unit 32 functions, for example, as a primary storage or a secondary storage. As an example, the storage unit 32 is contained in the information processing apparatus 30. Alternatively, the storage unit 32 may be externally connected to the information processing apparatus 30 via any interface.

The controller 33 includes one or more processors. In this embodiment, the controller 33 is a microcontroller. The controller 33 is, however, not limited to such, and may be any processor such as a general-purpose processor or a special-purpose processor dedicated to specific processing. The controller 33 controls the operation of the whole information processing apparatus 30.

(Hardware Structure of Server)

The hardware structure of the server 40 illustrated in FIG. 1 will be described below. The server 40 is one server apparatus or a plurality of server apparatuses communicable with each other. The server 40 includes a communication interface that communicates with the network 60, one or more memories, and one or more processors. The server 40 is, however, not limited to such, and may have any hardware.

(Hardware structure of terminal apparatus)

The hardware structure of the terminal apparatus 50 will be described below. The terminal apparatus 50 is, for example, a personal computer, a smartphone, or a tablet terminal. The terminal apparatus 50 is, however, not limited to such, and may be any apparatus used by the user. The terminal apparatus 50 includes a communication interface that communicates with the network 60, one or more memories, one or more processors, and a user interface that presents information to the user by video output or audio output. The terminal apparatus 50 is, however, not limited to such, and may have any hardware.

(Software Structure of Information Processing Apparatus)

The software structure of the information processing apparatus 30 will be described below, with reference to FIG. 2. One or more programs used to control the operation of the information processing apparatus 30 are stored in the storage unit 32. When the one or more programs are read by the controller 33, the one or more programs cause the controller 33 to function as a storage means 331, an acquisition means 332, a calculation means 333, an estimation means 334, and a transmission means 335.

An overview of each means will be given below. The storage means 331 is a means that stores information in the storage unit 32. The acquisition means 332 is a means that acquires information from the storage unit 32. The calculation means 333 is a means that calculates a first evaluation value E indicating the bias of vibration of the device 10 using data input from the detection apparatus 20, as described later. The estimation means 334 is a means that estimates the degradation level G of the device 10 based on the first evaluation value E, as described later. The transmission means 335 is a means that transmits the degradation level G to the server 40 via the communication unit 31 and the network 60. Detailed operation of each means will be described later.

(Operation of Information Processing System)

The operation of the information processing system 1 estimating the degradation level G of the device 10 will be described below, with reference to FIGS. 3 to 7. First, the detection apparatus 20 performs steps S100 to S101 illustrated in FIG. 3.

Figure 3:
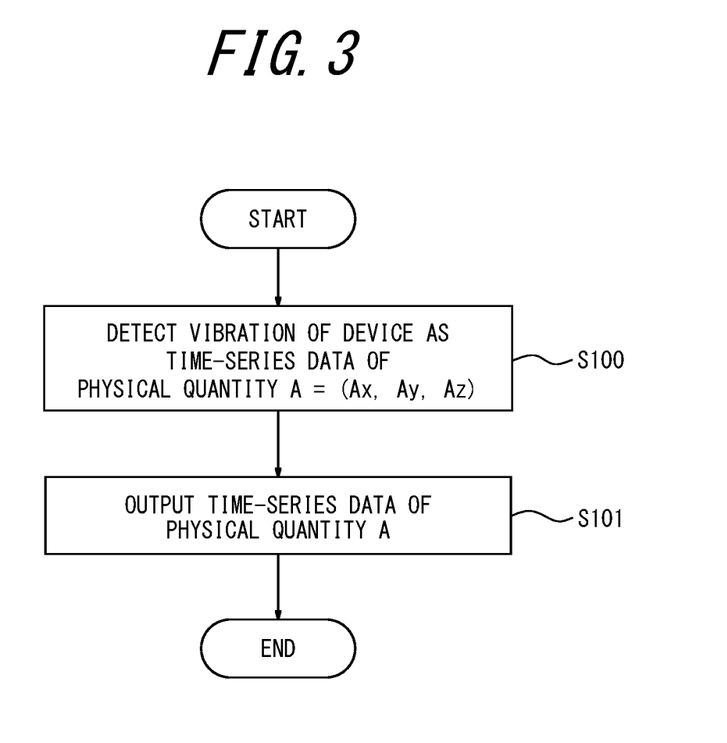
FIG. 3 is a flowchart illustrating an example of operation of a detection apparatus.

Step S100: The detection apparatus 20 detects vibration of the device 10 that vibrates during operation, as time-series data of a physical quantity A=(Ax, Ay, Az) indicated by three-axis (x-axis, y-axis, z-axis) components in a three-dimensional coordinate system. Non-limiting examples of the physical quantity A include acceleration, velocity, angular acceleration, angular velocity, and displacement.

Step S101: The detection apparatus 20 outputs the time-series data of the physical quantity A detected in step S100 to the information processing apparatus 30.

Figure 4:
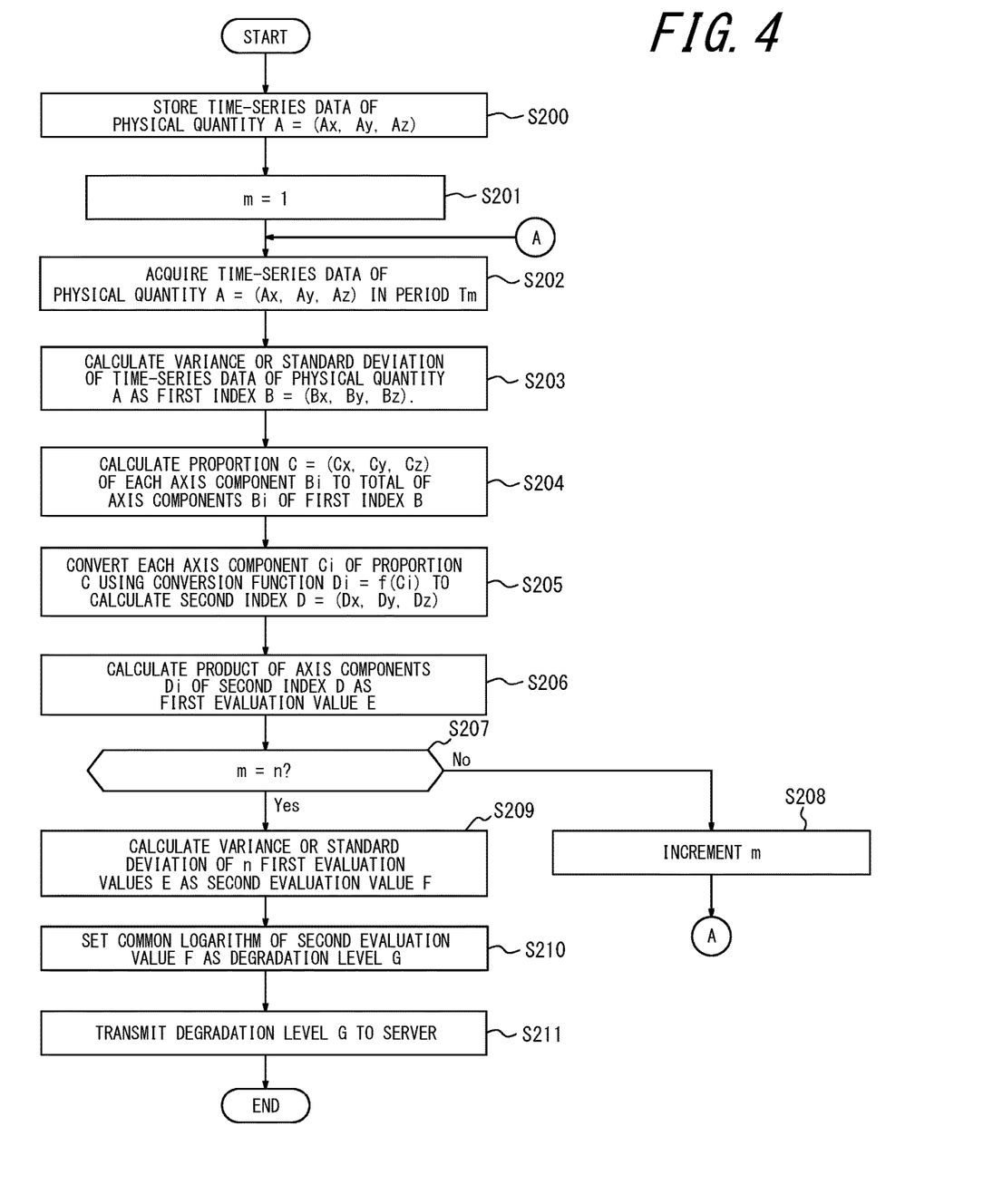
FIG. 4 is a flowchart illustrating an example of operation of the information processing apparatus.

Next, the information processing apparatus 30 performs steps S200 to S211 illustrated in FIG. 4.

Step S200: The storage means 331 stores the time-series data of the physical quantity A received from the detection apparatus 20 via the communication unit 31, in the storage unit 32. Here, suppose the time-series data of the physical quantity A in n periods T1 to Tn (where n is an integer greater than or equal to 2) is stored, as described later.

Step S201: The calculation means 333 sets a variable m to 1.

Step S202: The acquisition means 332 acquires time-series data in the period Tm from among the time-series data of the physical quantity A stored in the storage unit 32.

Step S203: The calculation means 333 calculates the variance or standard deviation for each axis component of the time-series data of the physical quantity A acquired in step S202, as a first index B=(Bx, By, Bz). For example, in the case where the variance of the time-series data of the physical quantity A for each axis component is the first index B, the first index B is calculated according to the following Formula (1):

$$B = (Bx, By, Bz) \quad (1)$$
$$= \left\{ \frac{1}{k}\sum_{j=1}^{k}(Axj - \overline{Ax})^2, \frac{1}{k}\sum_{j=1}^{k}(Ayj - \overline{Ay})^2, \sum_{j=1}^{k}(Azj - \overline{Az})^2 \right\}.$$

In Formula (1), k is the number of pieces of data of each axis component included in the time-series data of the physical quantity A (where k is an integer greater than or equal to 2). The first index B is a parameter indicating the degree of variation of the physical quantity A for each axis component.

Step S204: The calculation means 333 calculates a proportion C=(Cx, Cy, Cz) of each axis component Bi (where i is x, y, or z) of the first index B to the total of the axis components Bi. Specifically, the calculation means 333 calculates the proportion C using the first index B according to the following Formula (2):

$$C = (Cx, Cy, Cz) \quad (2)$$
$$= \{Bx/(Bx + By + Bz), By/(Bx + By + Bz), Bz/(Bx + By + Bz)\}.$$

The proportion C is a parameter indicating the balance (evenness) of the first index B (the degree of variation of the physical quantity A for each axis component) between the three axes. For example, when Cx=Cy=Cz=⅓, the balance of the first index B between the three axes is even.

Step S205: The calculation means 333 converts each axis component Ci of the proportion C using a predetermined conversion function f(Ci), to calculate a second index D=(Dx, Dy, Dz) that is minimum (e.g. 0) when the axis component Ci is ⅓ and is maximum (e.g. 1) when the axis component Ci is 0 or 1. Specifically, the calculation means 333 calculates the second index D using the proportion C according to the following Formula (3):

$$D=(Dx,Dy,Dz)=\{f(Cx),f(Cy),f(Cz)\} \quad (3).$$

Figure 5:
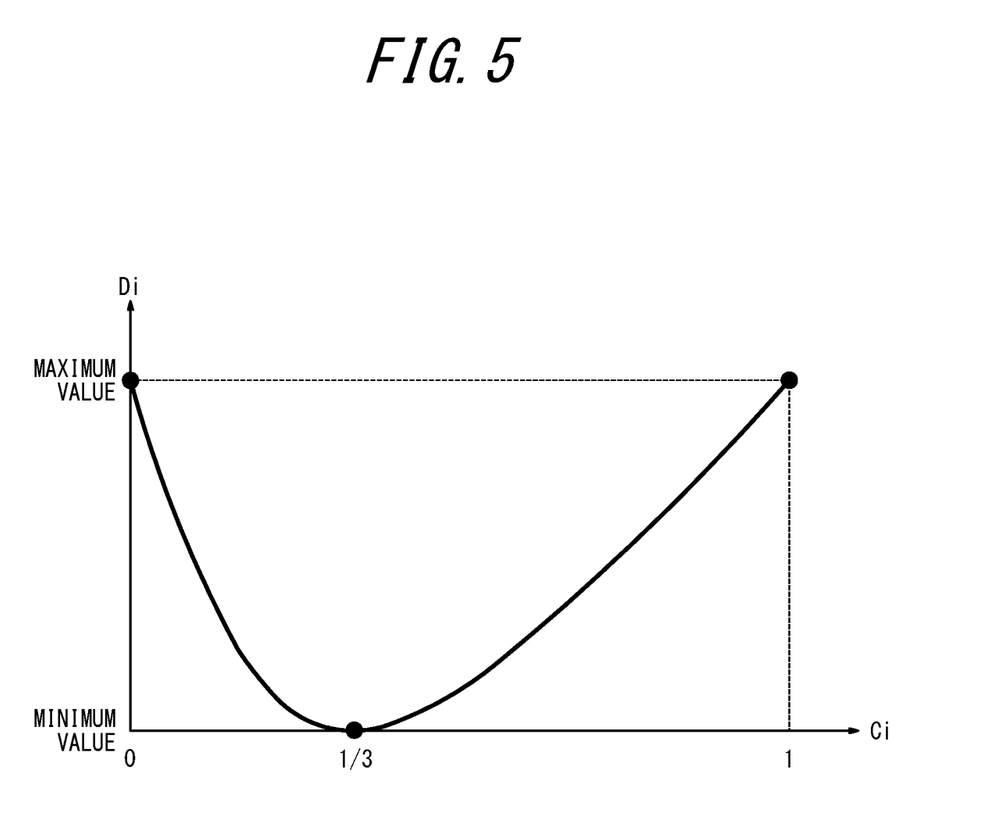
FIG. 5 is a diagram illustrating an example of the correspondence relationship between each axis component $C_i$ of a proportion C and each axis component $D_i$ of a second index D.

FIG. 5 is a graph illustrating an example of the conversion function Di=f(Ci). In the example illustrated in FIG. 5, the axis component Di of the second index D increases as the axis component Ci of the proportion C separates from ⅓. The conversion function Di=f(Ci) is, however, not limited to the example illustrated in FIG. 5. For example, there may be a range of the axis component Ci of the proportion C in which the axis component Di of the second index D decreases as the axis component Ci of the proportion C separates from ⅓. There may be a range of the axis component Ci of the proportion C in which the axis component Di of the second index D is unchanged even when the axis component Ci of the proportion C changes.

Step S206: The calculation means 333 calculates the product of the axis components Di of the second index D, as the first evaluation value E. Specifically, the calculation means 333 calculates the first evaluation value E using the second index D according to the following Formula (4):

$$E=Dx \times Dy \times Dz \quad (4).$$

The first evaluation value E is a parameter indicating the degree of bias of the vibration of the device 10 between the three axes. In detail, the first evaluation value E is minimum when the balance of the first index B (the degree of variation of the physical quantity A for each axis component) between the three axes is even (Cx=Cy=Cz=⅓) (i.e. when there is no bias of the vibration of the device 10 between the three axes). When the balance of the first index B between the three axes is lost and is uneven (i.e. when the degree of bias of the vibration of the device 10 between the three axes increases), the first evaluation value E increases.

Typically, when the degradation of the rotator progresses, vibration of a specific frequency predominantly occurs in a direction of any of the x-axis, the y-axis, and the z-axis. For example, a method of estimating the degree of degradation of the rotator by frequency-analyzing the vibration and detecting the vibration of the specific frequency may be used. However, to perform the frequency analysis, a sensor having relatively high sampling frequency (e.g. about 80 kHz) needs to be used to detect the vibration of the rotator. This causes an increase in processing load.

It is considered that, as a result of the vibration of the specific frequency occurring in any of the axis directions, the degree of bias of the vibration of the device 10 between the three axes increases. It is therefore possible to estimate the degradation of the rotator based on the degree of bias of the vibration of the device 10 between the three axes. Hence, in this embodiment, the degradation level G of the device 10 is estimated based on the first evaluation value E indicating the degree of bias of the vibration in the below-described steps S207 to S210. For example, another embodiment in which the first evaluation value E itself is set as the degradation level G may also be possible. In such a case, a higher degradation level G indicates that the device 10 degrades more. In this embodiment, however, the accuracy of estimating the degradation level G is improved as a result of the below-described steps S207 to S210. The reason why the accuracy of estimating the degradation level G is improved will be given later.

Step S207: The calculation means 333 determines whether m=n. In the case where the calculation means 333 determines that m=n (step S207: Yes), the process advances to step S209. In the case where the calculation means 333 determines that m≠n (step S207: No), the process advances to step S208.

Step S208: The calculation means 333 increments m. The process then returns to step S202. Thus, steps S202 to S208 are repeated until n first evaluation values E (hereafter also referred to as "first evaluation values E1 to En") respectively corresponding to the n periods T1 to Tn are calculated.

Step S209: In the case where the calculation means 333 determines that m=n in step S207 (i.e. in the case where the n first evaluation values E1 to En are calculated), the estimation means 334 calculates the variance or standard deviation of the n first evaluation values E1 to En as a second evaluation value F. For example, in the case where the standard deviation of the n first evaluation values E1 to En is the second evaluation value F, the second evaluation value F is calculated according to the following Formula (5):

$$F = \sqrt{\frac{1}{n}\sum_{j=1}^{n}(Ej - \overline{E})^2}. \quad (5)$$

The second evaluation value F is a parameter indicating the degree of variation of the n first evaluation values E1 to En (i.e. the temporal stability of the degree of bias of the vibration of the device 10 between the three axes).

Step S210: The estimation means 334 estimates the common logarithm of the second evaluation value F as the degradation level G.

The reason why the accuracy of estimating the degradation level G is improved as a result of steps S207 to S210 is as follows: When the degradation of the device 10 progresses, the degree of bias of the vibration of the device 10 between the three axes increases as mentioned above, and the first evaluation value E indicating the degree of bias of the vibration increases, too. However, for example, suppose the degree of bias of the vibration between the three axes increases due to a factor other than degradation. In such a case, the first evaluation value E increases despite the device 10 not degrading. Thus, for example in another embodiment in which the first evaluation value E itself is set as the degradation level G, the accuracy of estimating the degradation level G is not always sufficient.

When the degradation of the rotator progresses, the temporal change of the frequency spectrum of the vibration of the rotator increases. That is, when the degradation of the rotator progresses, the degree of bias of the vibration of the rotator between the three axes becomes unstable, i.e. increases/decreases, over time. Hence, the degradation of the rotator can be estimated based on whether the degree of bias of the vibration of the rotator between the three axes is stable over time. Accordingly, in this embodiment, the degradation level G is estimated based on the second evaluation value F indicating the degree of variation of then first evaluation values E1 to En (i.e. the temporal stability of the degree of bias of the vibration of the device 10 between the three axes), as described above with regard to steps S207 to S210. Although this embodiment describes the case where the common logarithm of the second evaluation value F is set as the degradation level G on the assumption that the number of digits of the second evaluation value F differs depending on the degree of degradation of the device 10, another embodiment in which the second evaluation value F itself is set as the degradation level G is also possible.

Step S211: The transmission means 335 transmits the degradation level G of the device 10 to the server 40 via the communication unit 31 and the network 60.

Figure 6:
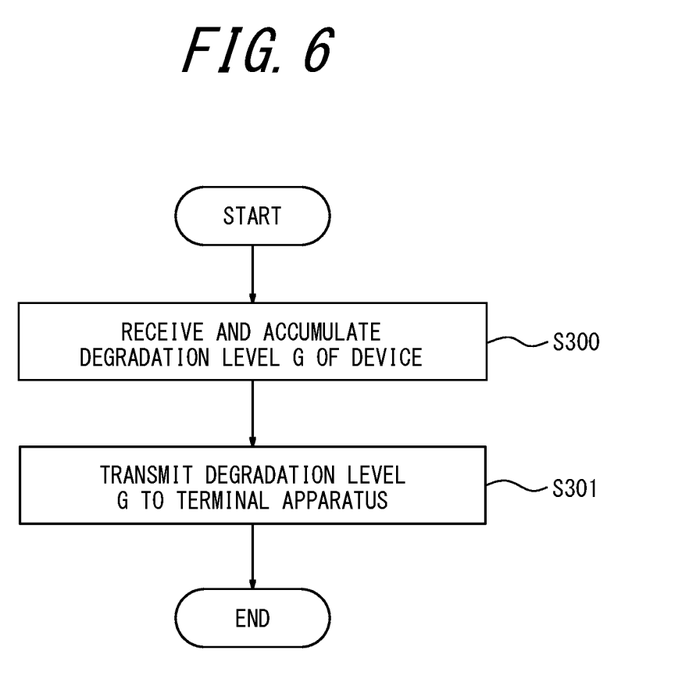
FIG. 6 is a flowchart illustrating an example of operation of a server.

Next, the server 40 performs steps S300 to S301 illustrated in FIG. 6.

Step S300: The server 40 receives the degradation level G of the device 10 from the information processing apparatus 30 via the network 60, and accumulates the degradation level G of the device 10 in the memory.

Step S301: The server 40 acquires the degradation level G of the device 10 from the memory, and transmits the degradation level G to the terminal apparatus 50 via the network 60. For example, the degradation level G may be pull-distributed from the server 40 in response to a request from the terminal apparatus 50, or push-distributed from the server 40.

Figure 7:
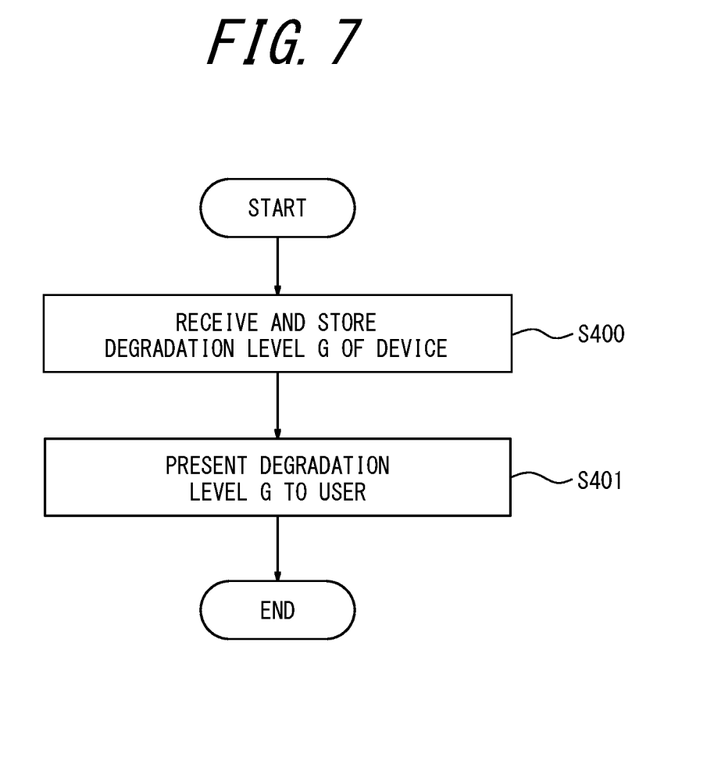
FIG. 7 is a flowchart illustrating an example of operation of a terminal apparatus.

Next, the terminal apparatus 50 performs steps S400 to S401 illustrated in FIG. 7.

Step S400: The terminal apparatus 50 receives the degradation level G of the device 10 from the server 40 via the network 60, and stores the degradation level G in the memory.

Step S400: The terminal apparatus 50, for example automatically or according to user operation, acquires the degradation level G from the memory, and presents the degradation level G to the user by video output or audio output. Based on the degradation level G presented by the terminal apparatus 50, the user can determine whether the device 10 needs maintenance, inspection, and the like, for example even when he or she is away from the device 10.

As described above, the information processing system 1 according to one of the disclosed embodiments includes: the acquisition means 332 that acquires the vibration of the device 10 as the time-series data of the physical quantity A=(Ax, Ay, Az) indicated by the three-axis (x, y, z) components in the three-dimensional coordinate system; the calculation means 333 that calculates the first evaluation value E indicating the degree of bias of the vibration of the device 10 between the three axes, based on the time-series data of the physical quantity A; and the estimation means 3334 that estimates the degradation level G of the device 10 based on the first evaluation value E. With such a structure, there is no need to perform frequency analysis on the time-series data of the physical quantity A. Thus, a sensor having relatively low sampling frequency (e.g. about 170 Hz) can be used in the detection apparatus 20. Moreover, a processor having relatively low computing power can be used in the information processing apparatus 30. The convenience of the techniques of estimating the state of a device using data from a sensor is therefore improved.

Although the presently disclosed techniques have been described by way of the drawings and examples, various changes and modifications may be easily made by those of ordinary skill in the art based on the present disclosure. Such changes and modifications are therefore included in the scope of the present disclosure. For example, the functions included in the means, steps, etc. may be rearranged without logical inconsistency, and a plurality of means, steps, etc. may be combined into one means, step, etc. and a means, step, etc. may be divided into a plurality of means, steps, etc.

For example, the detection apparatus 20 and the information processing apparatus 30 according to the foregoing embodiment may be implemented as one apparatus. For example, all or part of the operation performed by the information processing apparatus 30 according to the foregoing embodiment may be performed by the server 40. For example, the components or the means in the information processing apparatus 30 may be distributed between a plurality of information processing apparatuses. At least one of the plurality of information processing apparatuses may be, for example, a server connected to the network 60.

The foregoing embodiment describes an example of the operation of the information processing system 1 with reference to FIGS. 3, 4, 6, and 7. However, part of the steps included in the foregoing operation or part of operation included in one step may be omitted without logical inconsistency. Moreover, a plurality of steps included in the foregoing operation may be replaced with each other in order without logical inconsistency.

The foregoing embodiment describes an example in which, regarding the proportion C indicating the balance (evenness) of the first index B (the degree of variation of the physical quantity A for each axis component) between the three axes, when $Cx=Cy=Cz=1/3$, the balance of the first index B between the three axes is even. In other words, in the foregoing embodiment, the normal value of each axis component of the proportion C calculated when the device 10 operates normally is $1/3$. Each axis component $Ci$ of the proportion C is then converted using the predetermined conversion function $f(Ci)$ to calculate the second index D that is minimum (e.g. 0) when the axis component $Ci$ is the normal value ($1/3$ in the foregoing embodiment).

However, there is a possibility that, even when the device 10 operates normally, the balance of the first index B between the three axes is uneven. In other words, the normal values of the respective axis components of the proportion C can be different from one another. One example is that the normal value of $Cx$ is $2/5$, the normal value of $Cy$ is $2/5$, and the normal value of $Cz$ is $1/5$. In view of this, in one of the disclosed embodiments, the normal value of each axis component of the proportion C may be determined beforehand by, for example, experiment or simulation. The normal value is greater than 0 and less than 1. Moreover, conversion functions $fx(Cx)$, $fy(Cy)$, and $fz(Cz)$ may be determined beforehand for the respective axis components so as to yield a minimum value (e.g. 0) when the axis component $Ci$ of the proportion C is the normal value and a maximum value (e.g. 1) when the axis component $Ci$ is 0 or 1. In such a case, the calculation means 333 may convert the axis components $Cx$, $Cy$, and $Cz$ of the proportion C respectively using the conversion functions $fx(Cx)$, $fy(Cy)$, and $fz(Cz)$ to calculate the second index $D=(Dx, Dy, Dz)$.

The foregoing embodiment describes a structure of estimating the degradation of the rotator based on the degree of bias of the vibration of the device 10 between the three axes on the assumption that, when the degradation of the rotator progresses, vibration of a specific frequency occurs in an axis direction of any of the three axes. However, depending on the rotator, there is a possibility that the normal values of the respective axis components are different from one another as mentioned above, or that, when the degradation of the rotator progresses, vibration of the specific frequency occurs substantially not in one axis direction but in any of the other two axis directions. In view of this, in one of the disclosed embodiments, the vibration of the device 10 may be detected and acquired as time-series data of the physical quantity A indicated by two-axis components in the three-dimensional coordinate system. In such a case, "three-axis components" and "between three axes" in the foregoing description can be respectively interpreted as "two-axis components" and "between two axes".

The foregoing embodiment describes each means realized by the controller 33 in the information processing apparatus 30 as a software structure. However, at least one of these means may have a concept including a software resource and/or a hardware resource. For example, the storage means 331 may include one or more memories.

An apparatus such as a computer or a mobile phone may be used to function as the information processing apparatus 30 according to the foregoing embodiment. The apparatus can be implemented by storing, in a memory in the apparatus, a program describing processes for achieving the functions of the information processing apparatus 30 according to the foregoing embodiment and reading and executing the program by a processor in the apparatus.

REFERENCE SIGNS LIST

1 information processing system
10 device
20 detection apparatus
30 information processing apparatus
31 communication unit
32 storage unit
33 controller
331 storage means
332 acquisition means
333 calculation means
334 estimation means
335 transmission means
40 server
50 terminal apparatus
60 network

The invention claimed is:

1. An information processing system comprising:
a controller, including one or more processors, configured to:
acquire vibration of a device including a rotator, as time-series data of a physical quantity indicated by three-axis components in a three-dimensional coordinate system;
calculate a variance or a standard deviation of the time-series data of the physical quantity for each of the three-axis components, as each of three-axis components of a first index;

convert each of the three-axis components of the first index by a predetermined conversion process, to calculate each of three-axis components of a second index;

calculate, as a first evaluation value indicating a degree of bias of the vibration of the device between three axes, a product of the three-axis components of the second index; and estimate a degradation level of the device based on the first evaluation value.

2. The information processing system according to claim 1, wherein the controller is configured to, in the conversion process:

calculate a proportion of each axis component to a total of axis components of the first index; and convert each axis component of the proportion to calculate each axis component of the second index that is minimum when the axis component of the proportion is a predetermined value greater than 0 and less than 1 and is maximum when the axis component of the proportion is 0 or 1.

3. The information processing system according to claim 2, wherein the controller is configured to, in the conversion process:

convert each axis component of the proportion to calculate each axis component of the second index that is minimum when the axis component of the proportion is $1/3$ and is maximum when the axis component of the proportion is 0 or 1.

4. The information processing system according to claim 3, wherein each axis component of the second index increases as the axis component of the proportion separates from $1/3$.

5. The information processing system according to claim 2, wherein the controller is configured to determine, as the predetermined value, a normal value of each axis component of the proportion that is greater than 0 and less than 1.

6. The information processing system according to claim 1, wherein the controller is configured to:

calculate, based on a plurality of pieces of time-series data of the physical quantity detected in a respective plurality of periods that are different from each other, a plurality of first evaluation values corresponding to the respective plurality of periods, and calculate a variance or a standard deviation of the plurality of first evaluation values as a second evaluation value, and estimate the degradation level based on the second evaluation value.

7. The information processing system according to claim 6, wherein the controller is configured to set a common logarithm of the second evaluation value as the degradation level.

8. A non-transitory computer readable recording medium storing a program for causing an information processing apparatus to function as:

a controller, including one or more processors, configured to:

acquire vibration of a device including a rotator, as time-series data of a physical quantity indicated by three-axis components in a three-dimensional coordinate system;

calculate a variance or a standard deviation of the time-series data of the physical quantity for each of the three-axis components, as each of three-axis components of a first index;

convert each of the three-axis components of the first index by a predetermined conversion process, to calculate three-axis components of a second index;

calculate, as a first evaluation value indicating a degree of bias of the vibration of the device between three axes, a product of the three-axis components of the second index; and estimate a degradation level of the device based on the first evaluation value.

9. An information processing method comprising:

acquiring vibration of a device including a rotator, as time-series data of a physical quantity indicated by three-axis components in a three-dimensional coordinate system;

calculating a variance or a standard deviation of the time-series data of the physical quantity for each of the three-axis components, as each of three-axis components of a first index;

converting each of the three-axis components of the first index by a predetermined conversion process, to calculate three-axis components of a second index;

calculating, as a first evaluation value indicating a degree of bias of the vibration of the device between three axes, a product of the three-axis components of the second index; and estimating a degradation level of the device based on the first evaluation value.

\* \* \* \* \*